UNITED STATES PATENT OFFICE.

FRANCOIS ARCHAMBAULT, OF LYONS, FRANCE.

COMPOSITION FOR COATING CARBOYS OR OTHER VESSELS.

SPECIFICATION forming part of Letters Patent No. 668,275, dated February 19, 1901.

Application filed April 9, 1900. Serial No. 12,248. (No specimens.)

*To all whom it may concern:*

Be it known that I, FRANCOIS ARCHAMBAULT, a chemist, a citizen of France, residing at 94 Cours Lafayette, Lyons, France, have invented certain new and useful Improvements in Composition for Coating Carboys or other Vessels, of which the following is a specification.

The object of the present invention is a coating unattackable by acids or by humidity, lighter and cheaper than the actual packing, and of a small volume, which can be applied on any kind of carboy, bottles, and other objects of glass or pottery ware or on casks or other like vessels for the purpose of protecting them from breakage from shock or from damage from fire or acids.

This coating or paste is composed of one hundred parts, by weight, of pulverized cork, one hundred parts of silicate of potash, and fifteen parts of amianthus in powder. These three substances, mixed together without addition of water, form a plastic mass which is spread on the carboys or other objects to be protected. This first layer, more or less thick, according to the volume of the object, forms a thoroughly water-tight envelop which in case of inner fissures prevents the liquid from escaping even if it is a very powerful acid. This first layer is also unattackable by the humidity of cellars, whereas ordinary packing or coverings decay through damp.

This paste dries relatively in a very short time—about ten minutes—and makes a complete substance with the object on which it has been applied.

To place this paste easily on objects to be covered when they are voluminous, and especially carboys, I take a mold of wood or other material, in halves, having a section of about two centimeters larger than that of the carboy. I place on these two parts of the mold two pieces of some fabric which is not closely woven, such as light packing-canvas, gauze, &c. I place the carboy in the mold, pressing together the two parts, and then introduce the paste between the canvas and the carboy, pressing it well into all parts with a spatula or other instrument. The carboy is taken out and dried.

By giving the articles coated as described another thin coating with another composition of fifty parts, by weight, amianthus and twenty-four parts silicate of potash the objects provided with the two coatings are unattackable by fire, in consequence of the amianthus which covers them exteriorly.

The stoppers or bungs should be surrounded by amianthus-silicate paste, so as to produce a hermetic closing.

I declare that what I claim is—

1. A composition for coating carboys and other vessels consisting of powdered cork, amianthus, and silicate of potash, the weight of silicate of potash being in excess of the amianthus.

2. A composition for coating carboys and other vessels consisting of powdered cork, powdered amianthus and silicate of potash, the cork and silicate of potash being equal in weight and in excess of the amianthus.

3. A composition for coating carboys and other vessels consisting of one hundred parts of powdered cork, fifteen parts of amianthus and one hundred parts of silicate of potash.

4. A carboy having a coating composed of powdered cork, amianthus, and silicate of potash, the weight of silicate of potash being in excess of the amianthus.

5. A carboy having a coating composed of powdered cork, powdered amianthus and silicate of potash, the cork and silicate of potash being equal in weight and in excess of the amianthus.

6. A carboy having a coating composed of one hundred parts of powdered cork fifteen parts of amianthus and one hundred parts of silicate of potash.

7. A carboy having a coating composed of powdered cork, amianthus, and silicate of potash, the weight of silicate of potash, being in excess of the amianthus, with an exterior coating composed of amianthus and silicate of potash.

8. A carboy having a coating composed of powdered cork, powdered amianthus and silicate of potash, the cork and silicate of potash being equal in weight and in excess of the amianthus, with an exterior coating composed of amianthus and approximately half its weight of silicate of potash.

9. A carboy having a coating composed of one hundred parts of powdered cork, fifteen parts of amianthus and one hundred parts of silicate of potash, with an exterior coating composed of fifty parts of amianthus and twenty-four parts of silicate of potash.

In witness whereof I have signed this specification in the presence of two witnesses.

FRANCOIS ARCHAMBAULT.

Witnesses:
LAURENS COCHET,
PAUL BROCARD.